(No Model.)
P. D. GRAHAM.
HAND PLOW.
No. 394,918. Patented Dec. 18, 1888.
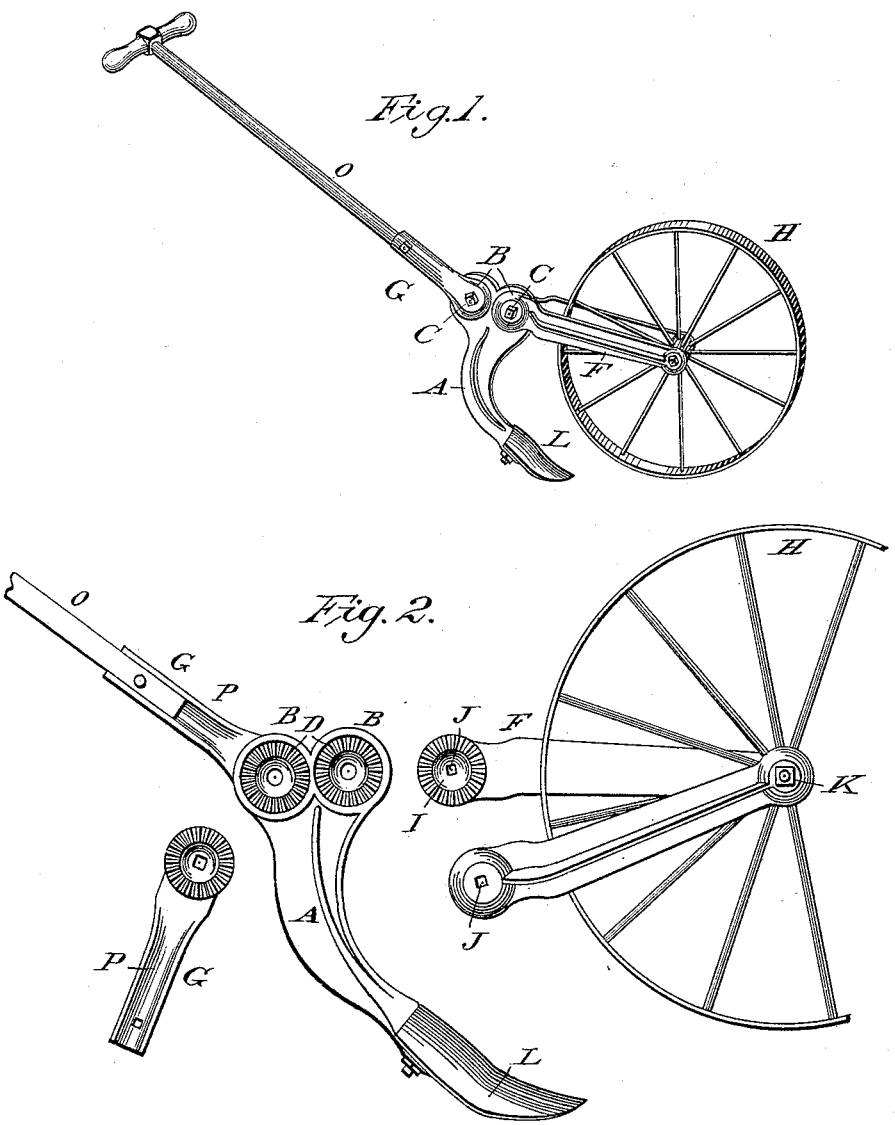

UNITED STATES PATENT OFFICE.

PETER DUNLAP GRAHAM, OF CORUNNA, INDIANA.

HAND-PLOW.

SPECIFICATION forming part of Letters Patent No. 394,918, dated December 18, 1888.

Application filed August 25, 1888. Serial No. 283,784. (No model.)

*To all whom it may concern:*

Be it known that I, PETER DUNLAP GRAHAM, of Corunna, in the county of De Kalb and State of Indiana, have invented certain new and useful Improvements in Hand-Plows; and I do hereby declare the following to be a full, clear, and exact description of the invention, such as will enable others skilled in the art to which it pertains to make and use it, reference being had to the accompanying drawings, which form a part of this specification.

My invention relates to that class of implements usually known as "hand-plows" or "garden-plows;" and it consists in the improved combinations and arrangements of parts hereinafter described and claimed.

The object of my invention is to provide a hand-plow in which the parts are adjustably connected in such a manner that the supporting-wheel may be raised or lowered, thus regulating the depth at which the shovel or plow may enter the ground; to adjustably attach the handle in such a manner that it may be raised or lowered to suit the height and convenience of the operator; a plow in which the pitch of the standard may be changed so as to cause the shovel to enter the ground either more or less slantingly, as the condition of the soil or the nature of the work desired to be accomplished may require, and a plow which may be mainly and cheaply constructed of castings in such a manner as to secure adjustability, rigidity, and durability without excessive weight.

Referring to the drawings, Figure 1 is a side elevation which embodies my invention complete. Fig. 2 is a perspective of a plow, showing the parts detached.

A represents the standard, which will preferably be made in the form here shown. Should it be desired, however, to attach more than one shovel, any other suitable form may be adopted. The standard A, being made of sufficient width at the top, two apertures, B, are formed at or near its upper end for the passage of the clamping-bolts C. Said apertures B are preferably made flaring or funnel-shaped on both sides of the standard, as in this shape they may be formed in the casting, and no drilling is required.

Formed around each of the openings B, on both sides of the standard A, are circular depressions D of sufficient size to receive the circular faces of the rear ends of the connecting-bars F and of the lower ends of the handle-plates G, to be attached thereto. The depressions D are preferably formed with ratchets on their bottom surface, as shown in Fig. 2 of the drawings, corresponding ratchets being also formed on the circular faces of the connecting-bars F and of the handle-plates G, as also shown in the drawings.

Pivoted or loosely connected to the hub of the supporting-wheel H are the two connecting-bars F, of any desired length, and having their rear ends formed to turn inwardly a short distance to the rear of the wheel H, so as to meet on opposite sides of the standard A, as shown in Fig. 1 of the drawings. The connecting-bars F are provided at their rear ends with transverse apertures J, corresponding with the aperture B in the standard A, at the point where they come together. A suitable clamping-bolt being inserted through said apertures, the parts are firmly bound together. The apertures J in the rear ends of the connecting-bars F are preferably formed flaring or funnel-shaped on their inner sides, as shown at I in Fig. 2 of the drawings, and terminating in a square hole on their outer sides, as shown at J. In this shape they may be formed in the casting, and no drilling is required. Square holes similarly formed are made in the front ends of the connecting-bars F for the passage of the bolt K, which passes through the hub of the wheel H.

The handle-plates G are formed as shown in the drawings, having circular faces formed on their inner sides at their front or lower ends, and being formed on their inner sides with a half-circular longitudinal groove, P, which extends to their rear or upper ends. The handle-plates G are also provided with apertures through their lower ends for the passage of the clamping-bolt which secures them to the standard, as shown at C in Fig. 1, and are further provided with holes through their rear or upper ends to receive the bolt which binds them to the handle O. All of the holes or apertures in the handle-plates G are made in the same shape and formed in the casting in the same manner as those described in the connecting-bars F and no drilling is required.

The handle O, which is preferably made of one-half-inch gas-pipe, has its upper end inserted in a wooden cross-head. A small bolt is then passed transversely through both the cross-head and the end of the gas-pipe inserted therein, which makes a very solid connection. The lower end of the handle O is inserted in the circular opening which is formed between handle-plates G when they are placed in position on opposite sides of the standard A. When the proper binding and clamping bolts are inserted, the handle O and the handle-plates G are secured together and to the standard A, as shown in Fig. 1 of the drawings.

From the construction herein shown and described it will be seen that when the nut on the clamping-bolt C which passes through the rear ends of the connecting-bars F is loosened the grip of said bars F upon standard A is released and the supporting-wheel H may be raised or lowered, thus permitting the shovel L to run deep or shallow, as may be desired. When the nut is again tightened, the parts will be rigidly secured in their adjusted position. Similarly, when the nut on the clamping-bolt C which passes through lower ends of the handle-plates G is loosened, the handle O may be raised or lowered and secured at any desired position to suit the operator. It will also be seen that by different adjustments of the wheel H and the handle O the pitch of the standard A may be changed so as to make the shovel L run as slantingly or as perpendicular as may be desired. The square holes in the connecting-bars F and in the handle-plates G prevent the bolts from turning when the nuts are being turned.

The machine is light, weighing only about fifteen pounds. Being almost wholly composed of metal, it is perfectly rigid, and will not shrink up and get rickety, and is far more durable than wood. Being mainly composed of castings and being so constructed that nearly all the holes may be formed in castings, thus avoiding the necessity of drilling, it is very easily and cheaply constructed.

What I claim, and desire to secure by Letters Patent, is—

1. The standard A, having the serrated openings B B, wheel H, and connecting-bars F, having serrated apertures at their rear ends, in combination with the handle-plates G, fitted to span the handle, and provided with rosette-disks to fit each side of the serrated-standard opening and to adjust thereon, and the clamping-bolts, substantially as shown and described.

2. The combination, in a hand-plow, of the standard having the apertures at its upper end, with the supporting-wheel, the connecting-bars having their rear ends adjustably secured to the standard, the handle adjustably secured to the standard, and the clamping-bolts, all substantially as set forth and described.

In testimony whereof I affix my signature in presence of two witnesses.

PETER DUNLAP GRAHAM.

Witnesses:
 BEN. GUSHMA,
 C. C. CISSEL.